(12) United States Patent
Tomida

(10) Patent No.: US 9,393,842 B2
(45) Date of Patent: Jul. 19, 2016

(54) TIRE

(71) Applicant: BRIDGESTONE CORPORATION, Chuo-ku, Tokyo (JP)

(72) Inventor: Tatsuya Tomida, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 119 days.

(21) Appl. No.: 14/208,313

(22) Filed: Mar. 13, 2014

(65) Prior Publication Data

US 2014/0290815 A1 Oct. 2, 2014

(30) Foreign Application Priority Data

Mar. 26, 2013 (JP) .................................. 2013-064936

(51) Int. Cl.
*B60C 11/12* (2006.01)

(52) U.S. Cl.
CPC ......... *B60C 11/1236* (2013.04); *B60C 11/1218* (2013.04)

(58) Field of Classification Search
CPC B60C 11/12; B60C 11/1218; B60C 11/1236; B60C 11/1204; B60C 2011/1209; B60C 2011/1213; B60C 11/1222; B60C 2011/1227; B60C 11/124; B60C 2011/1254
USPC .............................. 152/209.18, 209.8, 209.16
See application file for complete search history.

(56) References Cited

U.S. PATENT DOCUMENTS

| 7,637,295 | B2 * | 12/2009 | Hashimoto | .............. | B60C 11/12 152/209.15 |
| 2012/0180920 | A1 * | 7/2012 | Nagayasu | ........... | B60C 11/1218 152/209.21 |
| 2012/0305155 | A1 * | 12/2012 | Hamanaka | ............... | B60C 11/11 152/209.18 |
| 2013/0118662 | A1 * | 5/2013 | Kameda | .................. | B60C 11/03 152/209.8 |

FOREIGN PATENT DOCUMENTS

| CN | 100503281 C | 6/2009 |
| CN | 102806814 A | 12/2012 |

(Continued)

OTHER PUBLICATIONS

Japanese Office Action, dated Mar. 18, 2014, issued in corresponding Japanese Patent Application No. 2013-064936.

*Primary Examiner* — Eric Hug

(74) *Attorney, Agent, or Firm* — Sughrue Mion, PLLC

(57) ABSTRACT

An object of the present invention is to provide a tire exhibiting improved braking and driving performances on each of an icy/snowy road surface and a dry road surface. Specifically, the present invention provides a tire, comprising: a tread having at least two circumferential grooves formed therein; at least three rows of land portions demarcated in the ground contract surface by the at least two circumferential grooves, including a pair of outer side land portions and a central land portion other than the outer side land portions; a shoulder sipe formed in each outer side land portion such that respective ends of the sipe in the longitudinal direction thereof terminate in the outer side land portion, the shoulder sipe having in at least a portion in the depth direction thereof a bent section alternately bent on one side and the other side in the sipe width direction and continuously extending along the entire length in the sipe longitudinal direction to form a bent region; a center sipe formed in the central land portion such that each end of the sipe in the longitudinal direction thereof opens to either the circumferential groove or a lug groove, the center sipe having in at least a portion in the depth direction thereof: a bent section similar to the bent section of the shoulder sipe; and a flat section extending orthogonal to the ground contact surface of the tread, the flat section being continuous in the sipe longitudinal direction with at least one side of the bent region and extending in the sipe longitudinal direction to form a flat region.

6 Claims, 4 Drawing Sheets

(56) References Cited

FOREIGN PATENT DOCUMENTS

| | | |
|---|---|---|
| CN | 203805639 U | 9/2014 |
| EP | 1787826 A1 | 5/2007 |
| JP | 2003146023 A | 5/2003 |
| JP | 2004026158 A | 1/2004 |
| JP | 2007106314 A | 4/2007 |
| JP | 2012-162247 A | 8/2012 |
| WO | 2006/022120 A1 | 3/2006 |

* cited by examiner ns a load corresponding to the maximum load capacity.

TIRE

TECHNICAL FIELD

The present invention relates to a tire exhibiting improved driving performance on each of an icy/snowy road surface and a dry road surface.

BACKGROUND ART

PTL 1 as the prior art discloses, for the purpose of achieving good on-ice/snow performance and good dry performance of a tire in a compatible manner, a tire in which configurations and combinations of sipes are meticulously specified in the central region and shoulder regions in the tire width direction of a tread, respectively, to impart land portions of the tread with a specific rigidity distribution, so that good on-ice/snow performance is ensured by relatively low rigid land portions and good dry performance and snow performance are ensured by relatively high rigid land portions.

CITATION LIST

Patent Literature

PTL 1: WO 2006/022120

SUMMARY OF THE INVENTION

Technical Problems

In recent years, however, there has been an increasing demand for further improvement of driving performance of a tire on each of an icy/snowy road surface and a dry road surface. An object of the present invention is to provide a tire exhibiting improved driving performance on each of an icy/snowy road surface and a dry road surface.

Solution to the Problems

A tire of the present invention characteristically comprising: a tread having at least two circumferential grooves formed in a ground contact surface thereof; at least three rows of land portions demarcated in the ground contract surface by the at least two circumferential grooves, including a pair of outer side land portions located on the outermost side in the tread width direction and a central land portion constituted of the land portion(s) other than the outer side land portions; a shoulder sipe formed in each outer side land portion such that respective ends of the sipe in the longitudinal direction thereof terminate in the outer side land portion, the shoulder sipe having in at least a portion in the depth direction thereof a bent section alternately bent on one side and the other side in the sipe width direction and continuously extending along the entire length in the sipe longitudinal direction to form a bent region; a center sipe formed in the central land portion such that each end of the sipe in the longitudinal direction thereof opens to either the circumferential groove or a lug groove, the center sipe having in at least a portion in the depth direction thereof: a bent section alternately bent on one side and the other side in the sipe width direction and continuously extending in the sipe longitudinal direction to form a bent region; and a flat section extending orthogonal to the ground contact surface of the tread, the flat section being continuous in the sipe longitudinal direction with at least one side of the bent region and extending in the sipe longitudinal direction to form a flat region.

Advantageous Effect of the Invention

According to the present invention, it is possible to provide a tire exhibiting improved driving performance on each of an icy/snowy road surface and a dry road surface.

DESCRIPTION OF THE EMBODIMENTS

An embodiment of a tire according to the present invention will be described in detail with reference to the drawings hereinafter.

Figure 1:
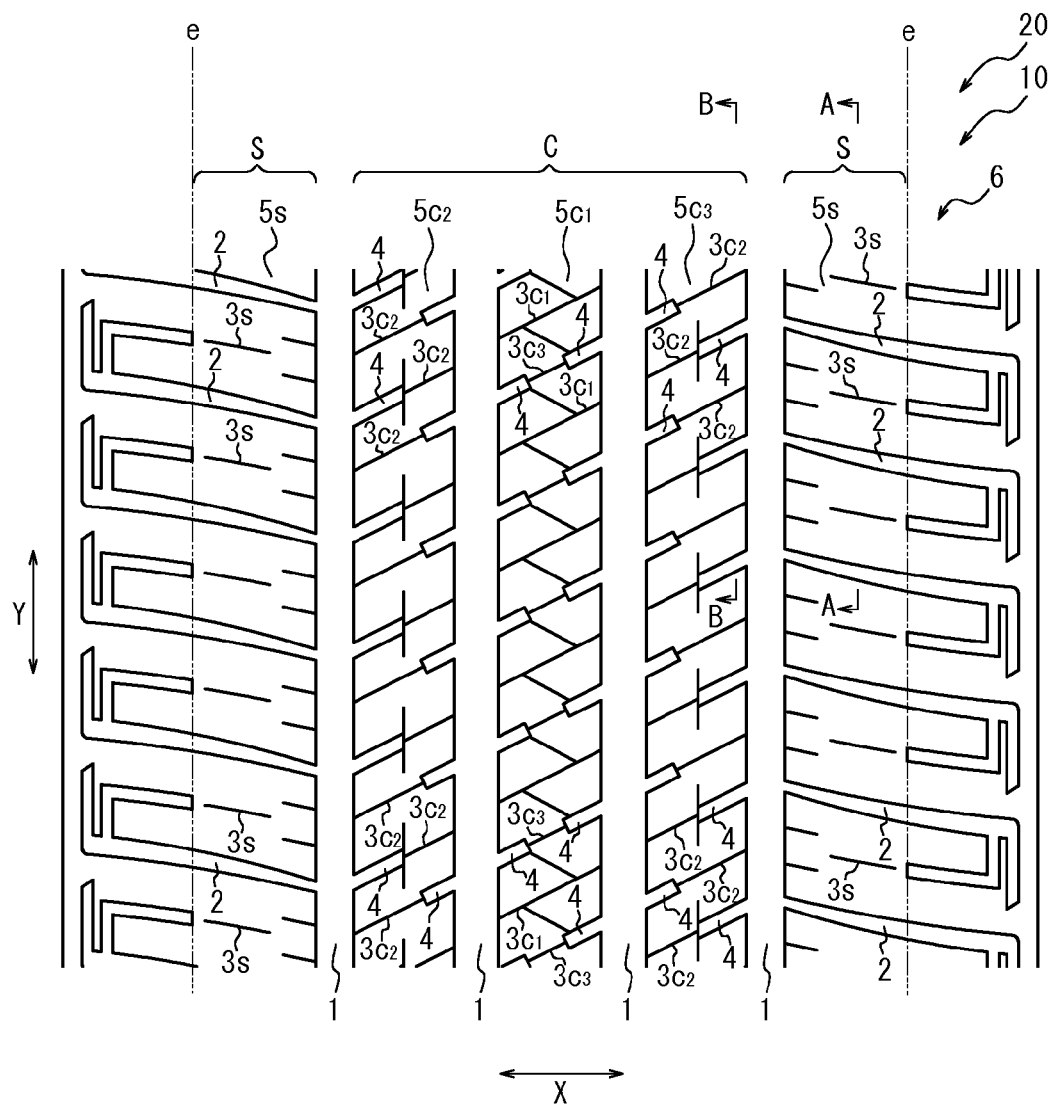
FIG. 1 is a partial developed view of a tread of a tire according to a first embodiment of the present invention.

FIG. 1 is a partial developed view of a tread 6 of a tire 10 according to a first embodiment of the present invention. The tire 10 has, although details are not shown in the drawings, a pair of bead portions, a pair of sidewall portions, a tread portion provided across the respective sidewall portions, a carcass constituted of plies made of organic fiber cords or steel cords and extending from one bead portion to the other bead portion via the tread portion, and a belt as steel cord layers disposed between the carcass and the tread 6 made of tread rubber.

Five land portions rows are demarcated in the tire width direction (the X direction indicated in FIG. 1) by four circumferential grooves 1 extending in the tire circumferential direction (the Y direction indicated in FIG. 1) in a ground contact surface of the tread 6. The circumferential grooves 1 may have non-linear configurations such as zigzag, saw-tooth and wavy configurations, although the circumferential grooves 1 are linear in the example shown in FIG. 1.

In the present invention, a pair of land portions $5s$, $5s$ located on the outermost side in the tire width direction among land portion rows 5 constitutes outer side land portions S; and land portions $5c_2$, $5c_3$ adjacent to the land portions $5s$ by way of the circumferential grooves 1, respectively, and a land portion $5c_1$ located between the land portion $5c_2$ and the land portion $5c_3$ collectively constitute a central land portion C. On this basis, the tread 6 of the tire 10 according to the first embodiment will be described hereinafter. Each "outer side land portion S" basically represents a region of the land portion $5s$ up to a ground contact end e on the outer side in the tire width direction of the tread 6 in the following description of the present invention. A "ground contact end e" of the tread 6 represents, when the tire 10 is assembled with an application rim, inflated at a predetermined air pressure, placed on a flat plate in a state where the tire is still and orthogonal with respect to the plate and has load corresponding to a predetermined mass exerted thereon, each end in the tire width direction of a tread surface in contact with the plate.

First, each land portion $5s$, at least a portion of which constitutes a corresponding outer side land portion S, has: lateral grooves 2 each extending toward the inner side in the tire width direction from a shoulder portion of the tread portion 6 to open to the corresponding outermost circumferential groove 1 in the tire width direction; and shoulder sipes $3s$ each extending toward the inner side in the tire width direction from the vicinity of a ground contact end e of the tread 6 to terminate within the outer side land portion S. The lateral grooves 2 and the sipes $3s$ are disposed alternately in the tire circumferential direction. The shoulder sipes $3s$ may occasionally be referred to as simply "sipes $3s$" hereinafter.

The land portions $5c_1$, $5c_2$ and $5c_3$ constituting the central land portion C each extend to be inclined with respect to the tire circumferential direction and have lug grooves 4 of which one ends open to one circumferential groove 1 and the other ends terminate within the land portion $5c_1$, $5c_2$, $5c_3$. The land portion $5c_1$ further includes: center sipes $3c_1$ each extending in substantially the same direction as the lug grooves 4 and of which both ends open to the circumferential grooves 1; and center sipes $3c_3$ of which both ends open to the lug grooves 4. The land portions $5c_2$ and $5c_3$ each include center sipes $3c_2$ of which one ends open to the circumferential groove 1 and the other ends open to the lug grooves 4. These center sipes $3c_1$, $3c_2$, $3c_3$ may occasionally be referred to as simply "sipes $3c$" hereinafter.

The three land portions constituting the central land portion C will be described further in detail. The land portion $5c_1$ located at the center of the central land portion C has: one group of the lug grooves 4 each extending from one circumferential groove 1 demarcating the land portion $5c_1$; the other group of the lug grooves 4 extending from the other circumferential groove 1 demarcating the land portion $5c_1$ so as to be aligned with the extension lines of the one group of the lug grooves 4, respectively; the sipes $3c_3$ linking the lug grooves 4 on the respective (one and the other) sides; and sipes $3c_1$ each extending across the land portion $5c_1$ to link the one circumferential groove 1 and the other circumferential groove 1. The sipes $3c_3$ and $3c_1$ are disposed alternately disposed in the circumferential direction. The land portion $5c_2$ has: one group of the sipes $3c_2$ for linking a group of the lug grooves 4 extending from one circumferential groove 1 demarcating the land portion $5c_2$, to the other circumferential groove 1 demarcating the land portion $5c_2$; and the other group of the sipes $3c_2$ for linking the other group of the lug grooves 4 extending from the other circumferential groove 1 demarcating the land portion $5c_2$, to the one circumferential groove 1 demarcating the land portion $5c_2$. The one group of the sipes $3c_2$ and the other groups of the sipes $3c_2$ are alternately disposed in the circumferential direction. The land portion $5c_3$ is a land portion which is point-symmetrical with respect to the land portion $5c_2$ around a given point on the tire equatorial line.

The sipes $3c_1$, $3c_2$ and $3c_3$ may have non-linear configurations such as zigzag, saw-toogh, wavy configurations, although the sipes $3c_1$, $3c_2$ and $3c_3$ in the example shown in FIG. 1 extend linearly.

Figure 2A:
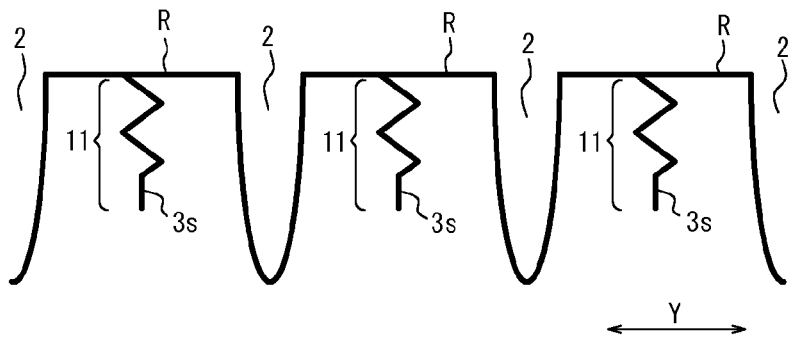
FIG. 2A is an end view of the tread cut along the A-A line of FIG. 1
Figure 3:
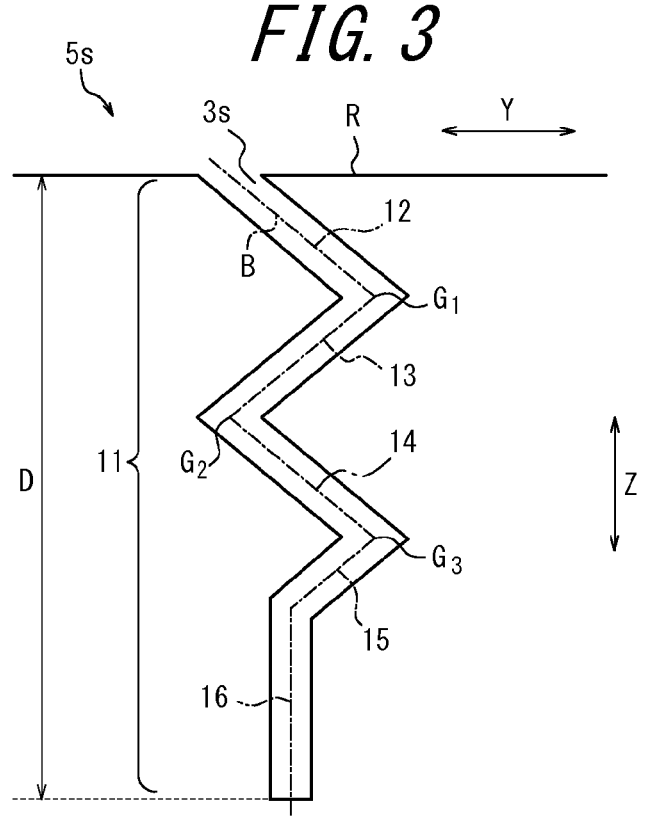
FIG. 3 is an enlarged end view of a sipe ($3s$) shown in FIG. 2A.

The sipes $3s$ provided in the outer side land portion S, among the aforementioned respective sipes, each have in at least a portion in the depth direction, i.e. the tire radial direction, thereof a bent section 11 alternately bent on one side and the other side in the sipe width direction of the sipe $3s$ in an end view of the sipe $3s$ cut along the tire circumferential direction (the A-A line of FIG. 1), as shown in FIG. 2A. FIG. 3 shows such an end-view configuration of the sipe $3s$ as depicted in FIG. 2A in an enlarged manner. The sipe $3s$, when viewed from a ground contact tread surface R in the land portion $5s$ in the sipe depth direction thereof, i.e. the direction Z in FIG. 3, has the bent section 11 including: an inclined portion 12 extending from the ground contact surface R to be inclined on one side in the sipe with direction; another inclined portion 13 extending to be inclined on the other side in the sipe width direction via a bending point $G_1$; yet another inclined portion 14 extending to be inclined on the one side in the sipe width direction again via a bending point $G_2$; yet another inclined portion 15 extending to be inclined on the other side in the sipe width direction again via a bending point $G_3$; and a vertical portion 16 extending vertically from a land-portion-bottom side portion of the inclined portion 15 in the sipe depth direction, in this order.

Figure 4:
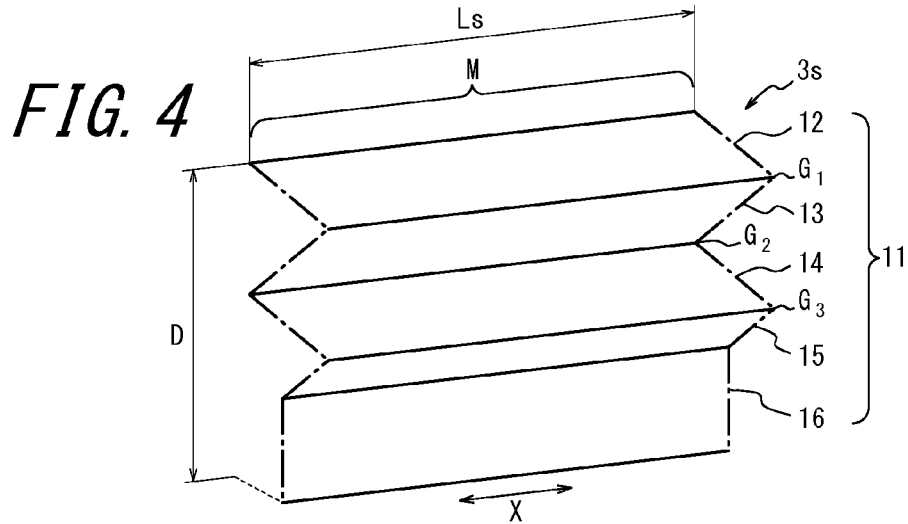
FIG. 4 is a diagram showing a configuration of the sipe ($3s$) of FIG. 2A along the longitudinal direction thereof.

FIG. 4 is a view showing the aforementioned configuration of the sipe $3s$ over the longitudinal length of the sipe. In the sipe $3s$, the same configuration as the end-view configuration in FIG. 3 is continuously maintained over the entire longitudinal length thereof, as shown in FIG. 4.

The sipe $3s$ is a space enclosed with respective wall surfaces which face each other with a constant opening width therebetween, of the outer side land portion $5s$ of the tread 6. Planes defined as a continuous extension of a width center line B (the line indicated by the alternate long dash and short dash line in FIG. 3) of the sipe $3s$ in the sipe longitudinal direction represents a "sipe configuration of the sipe $3s$" in the present embodiment. That is, the sipe $3s$ has a bent section M as a continuous extension of the bent section 11 in the sipe longitudinal direction.

Figure 2B:
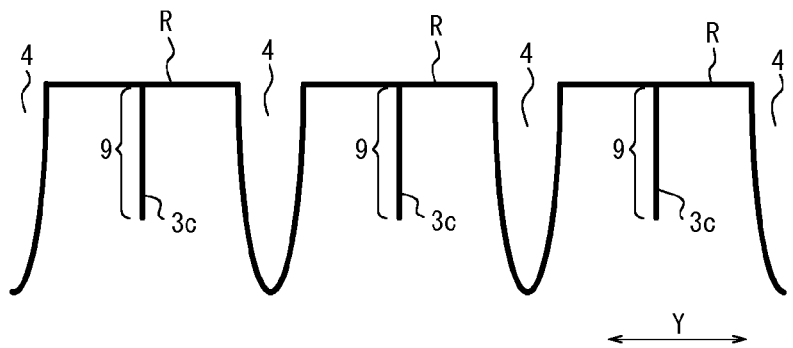
FIG. 2B is an end view of the tread cut along the B-B line of FIG. 1.

The sipes $3c$ (i.e. the sipes $3c_1$, $3c_2$ and $3c_3$) provided in the central land portion C each have in an end view thereof cut along the sipe width direction: a bent section 11 extending from the ground contact surface R of the tread over at least a portion in the depth direction thereof to be alternately bent on one side and the other side in the sipe width direction of the sipe $3c$ to form a bent region M, as in the sipe $3s$; and a flat section 9 not bent in the sipe depth direction and continuous in the sipe longitudinal direction with at least one side of the bent region M. FIG. 2B is an end view of the vicinities of end portions in the sipe longitudinal direction of the sipes $3c$ (cut along the tire circumferential direction, i.e. the line B-B of FIG. 1). Each sipe $3c$ has the flat section 9 provided to be continuous with at least one side of the bent region M in the longitudinal direction thereof, as shown in FIG. 2B.

Figure 5:
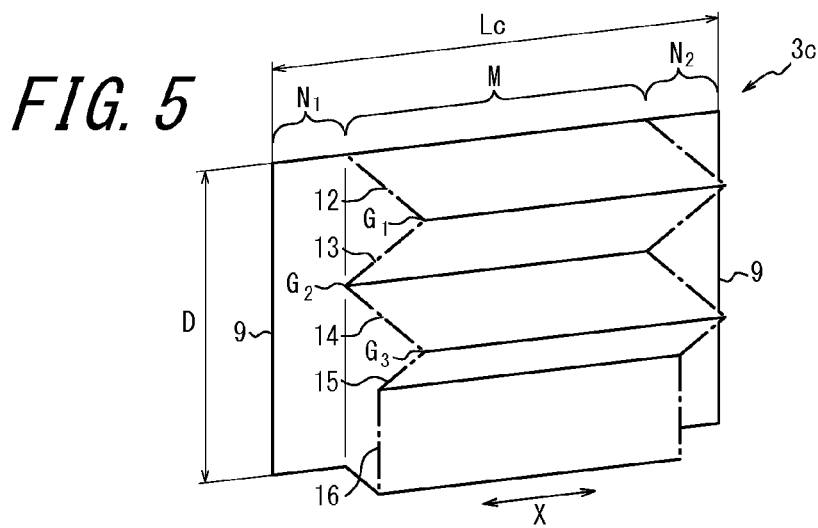
FIG. 5 is a diagram showing a configuration of the sipe ($3c$) of FIG. 2B along the longitudinal direction thereof.

FIG. 5 is a view showing an example of the aforementioned configuration of the sipe $3c$ over the longitudinal length thereof. Specifically, the sipe $3c$ has the bent region M at the center in the longitudinal direction thereof and flat regions $N_1$ and $N_2$ (the flat sections 9) provided to be continuous with respective sides of the bent region M in the longitudinal direction thereof.

In the tire according to the present invention, the sipes $3s$ are formed in each outer side land portion S such that respective ends of the sipes in the longitudinal direction thereof terminate in the outer side land portion. Each of the sipe $3s$ has in at least a portion in the depth direction thereof the bent section 11 alternately bent on one side and the other side in the sipe width direction and continuously extending along the entire length in the sipe longitudinal direction to form the bent region M. On the other hand, the center sipes $3c$ are formed in the central land portion C such that ends of the sipes in the longitudinal direction thereof open to either the circumferential groove 1 or other (lug) grooves. Each of the center sipes has in at least a portion in the depth direction thereof: the bent section 11 alternately bent on one side and the other side in the sipe width direction and continuously extending along in the sipe longitudinal direction to form the bent region M; and a flat section 9 extending orthogonal to the ground contact surface R of the tread, the flat section being continuous in the sipe longitudinal direction with at least one side of the bent region M and extending in the sipe longitudinal direction to form a flat region N, as described above.

According to the tire of the present invention having the structure described above, collapse of the land portion 5s is suppressed so that sufficiently high rigidity and a sufficiently large ground contact area of the land portion 5s can be ensured in the outer side land portions S affecting driving performance on a dry road surface; and opening of edge portions of the sipes 3c to a ground contact surface R of the tread is well facilitated in the central land portion C affecting driving performance on an icy/snowy road surface, whereby the tire is capable of exhibiting good braking and driving performances on each of an icy/snowy road surface and a dry road surface.

In the present embodiment, one of the features contributing to ensuring satisfactorily high rigidities of the outer side land portion 5s and the central land portion 5c is the configuration of the bent section 11 possessed by each of the sipes 3s and the sipes 3c in at least a portion in the depth direction thereof. For example, in the case of the sipe 3s with a configuration having the bent section 11 in a portion in the depth direction thereof as shown in FIG. 3, wall surfaces facing each other, of inclined faces continuous in the sipe longitudinal direction of the respective inclined portions 12 to 15, are firmly brought into contact with each other to suppress collapse of the land portion 5s when a force is applied from the ground contact surface R thereon. Specifically, when a force is exerted on the land portion 5s by a road surface in a direction from the left hand side to the right hand side in FIG. 3, the wall surfaces separated by the sipe 3s, of the land portion 5s, are firmly brought into contact with each other in the inclined portions 13 and 15, whereby the land portion 5s on the side where the force is inputted from the road surface (the left hand side of the land portion 5s in FIG. 3) is well supported by friction force between the wall surfaces and thus collapsing deformation of the land portion 5s is well suppressed. When a force is exerted on the land portion 5s by a road surface in a direction from the right hand side to the left hand side in FIG. 3, the wall surfaces separated by the sipe 3s, of the land portion 5s, are firmly brought into contact with each other in the inclined portions 12 and 14, whereby the land portion 5s on the side where the force is inputted from the road surface (the right hand side of the land portion 5s in FIG. 3) is well supported by friction force between the wall surfaces and thus collapsing deformation of the land portion 5s is well suppressed.

In the outer side land portion S in particular, the respective ends in the sipe longitudinal direction of the sipes 3s terminate within the land portion 5s, whereby collapse of the land portion 5s is effectively suppressed and thus rigidity of the land portion 5s can be more effectively maintained. In the central land portion C, the flat regions $N_1$ and $N_2$ are provided on the respective ends in the longitudinal direction of each of the sipes 3c, for example, and each of these ends in the longitudinal direction of the sipe 3c opens to either the circumferential groove 1 or the lug groove 4 as shown in FIG. 5, whereby it is possible to facilitate opening of edges of the sipes 3c at a ground contact surface R of the tread to improve an edge effect of the sipes 3c, while avoiding excessively decreasing rigidity of the land portion 5c.

Figure 6:
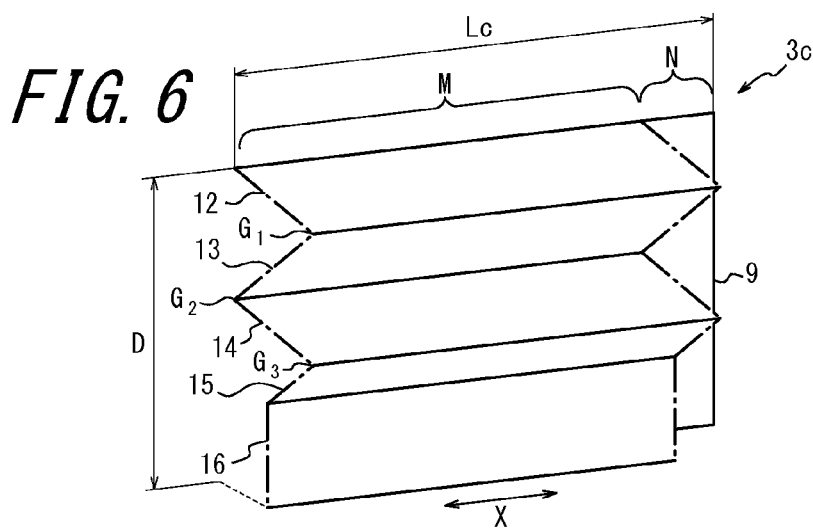
FIG. 6 is a diagram showing another applicable configuration of the sipe ($3c$) along the longitudinal direction thereof.

Each of the sipes 3c in the central land portion C may have the flat region N only one end side in the sipe longitudinal direction thereof, as shown in FIG. 6. In a case where such a sipe having the configuration as described above is applied to a sipe of which one end in the longitudinal direction thereof opens to a groove and the other end terminates within the land portion 5c, it is preferable that the bent region M of the sipe is disposed on the groove-opening side and the flat region N of the sipe is disposed on the side terminating in the land portion 5c because then a mold can be safely removed from a product tire after vulcanization molding without chipping the vicinities of sipes, which is advantageous in terms of tire production.

Further, it is preferable that the outer side lane portions S are block-like land portions demarcated by the tire circumferential groove and the lateral (tire widthwise) grooves and the central land portion C is constituted of rib-like land portions demarcated by only the circumferential grooves in the tire according to the present invention. The outer side land portions S experience relatively high ground contact pressure when the tire is driven. Providing the outer side land portions S with block-like patterns can improve driving performance of the tire under such high ground contact pressure, in this regard. The central land portion C which is constantly within a ground contact region of the tread 6 on each of an icy/snowy road and a dry road can have a larger ground contact area and thus exhibit better handling properties when the central land portion C is constituted of rib-like land portions than is constituted of block-like land portions.

Providing the central land portion C with the lug grooves 4 of which one ends open to the circumferential groove, as in the tread 6 shown in FIG. 1 is preferable in terms of enhancing gripping force in the central land portion C.

The sipe depths D of the sipes 3s and the sipes 3c in the tire 10 of the first embodiment described above are in the range of 3 mm to 8 mm. The sipe depth(s) of the flat region(s) N ($N_1$ and $N_2$) of each of the sipes 3c may be different from the sipe depth of the bent region M, although the former is equal to the latter in FIG. 5 and FIG. 6. The vertical portions 16 of the sipes 3s and the sipes 3c, linearly extending in the sipe depth direction in a cross section in the sipe width direction, may alternatively have a configuration continuously extending from the inclined portion 15 in the extending direction of the inclined portion 15.

Figure 7:
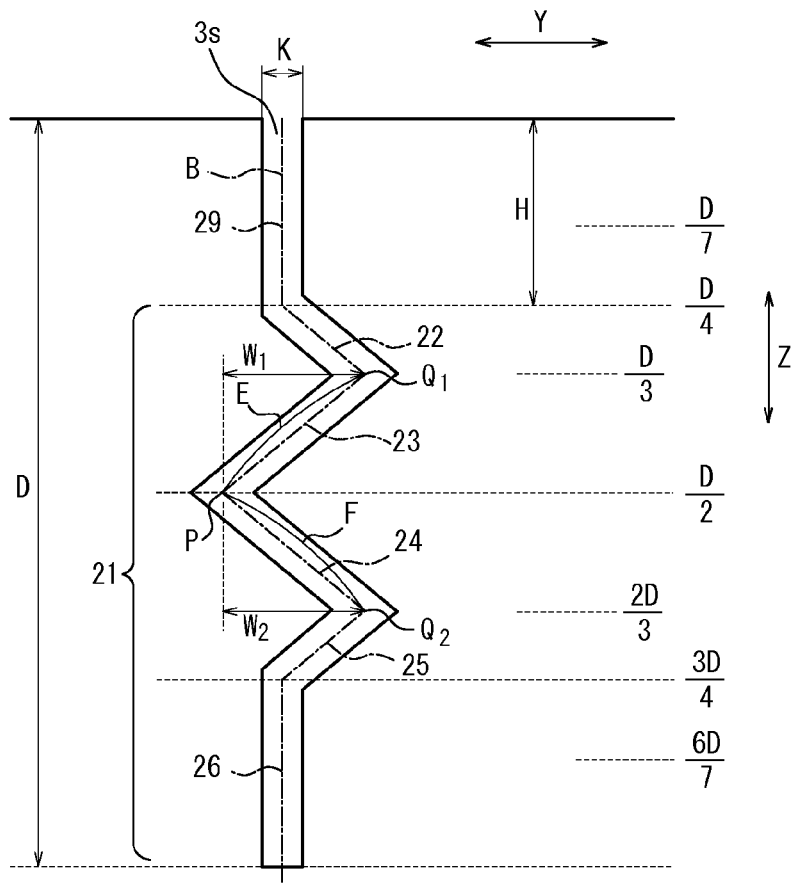
FIG. 7 is an enlarged end view of a sipe ($3s$) of a tire according to a second embodiment of the present invention.

Next, a tire 20 according to a second embodiment of the present invention will be described. The tire 20 has a tread 6 similar to the tread 6 of the tire 10 according to the first embodiment shown in FIG. 1 and shoulder sipes 3s in the outer side land portions 5s, each shoulder sipe 3s having a configuration as shown in FIG. 7 in an end view in the sipe width direction thereof. Regarding the structures of the tire 20 of the second embodiment, the same reference number will be assigned to the same structures as the tire 10 of the first embodiment and detailed explanations thereof will be omitted.

With reference to FIG. 7, the sipes 3s provided in the tread 6 of the tire 20 each have a vertical portion 29 formed in a depth region of the sipe ranging from a ground contact surface R of the tread to the D/4 position in the depth direction such that the vertical portion 29, opening to the ground contact tread surface R of the land portion 5s, extends linearly from the ground contact surface R toward the sipe bottom in the sipe depth direction (the Z direction indicated in FIG. 7).

Each sipe 3s further has: in a depth region ranging from the D/4 position to the D/3 position, measured from the ground contact surface R of the tread, an inclined portion 22 extending downward from the vertical portion 29 to be inclined on one side in the sipe width direction (i.e. extending from the vertical direction 29 toward the right-down side in FIG. 7); in a subsequent depth region ranging from the D/3 position to the D/2 position, measured from the ground contact surface R of the tread, an inclined portion 23 corresponding to the aforementioned inclined portion 13 and extending downward from a first secondary bending point $Q_1$ at the D/3 depth position of the inclined portion 22, to be inclined on the other side in the sipe width direction opposite to the one side (i.e. extending from the inclined portion 22 toward the left-down side in FIG. 7); in a subsequent depth region ranging from the D/2 position to the 2D/3 position, measured from the ground contact surface R of the tread, an inclined portion 24 corresponding to the aforementioned inclined portion 14 and extending downward from the primary bending point P at the D/2 depth position of the inclined portion 23, to be inclined on the one side again (i.e. extending from the inclined portion 23 toward the right-down side again in FIG. 7); in a subsequent depth region ranging from the 2D/3 position to the 3D/4 position, measured from the ground contact surface R of the tread, an inclined portion 25 extending downward from a second secondary bending point $Q_2$ at the 2D/3 depth position of the inclined portion 24, to be inclined on the other side again (i.e. extending from the inclined portion 24 toward the left-down side again in FIG. 7); and a vertical portion 26 extending linearly in the sipe depth direction from the land-portion-bottom side end of the inclined portion 25 toward the bottom of the land portion 5s.

In short, it is preferable that in the tire 20 of the present embodiment the shoulder sipes 3s and the center sipes 3c each have the vertical portion 29 extending orthogonal to the ground contact surface R of the tread between the ground contact surface R and the bent section 11 thereof, as typically shown in the end-view configuration in the sipe width direction of the sipe 3s of FIG. 7.

The sipe 3s, 3c including the vertical portion 29 extending from the ground contact surface R of the tread in the direction substantially orthogonal to the ground contact surface R can increase rigidity of the vicinities of sipe edges exposed at the ground contact surface R of the tread, thereby successfully suppressing chipping of the vicinities of the sipe edges due to winding deformation thereof caused by a force inputted from a road surface when the tire runs on a dry road surface in particular. Further, the vicinities of the sipe edges relatively easily open to enhance an edge effect regardless of the direction in which a force is inputted from a road surface in this case, which is particularly advantageous when the tire runs on an icy/snowy road surface.

The length H of the vertical portion 29 measured from the ground contact surface R of the tread in the sipe depth direction is preferably at least 1/7 of the sipe depth D measured from the ground contact surface R because the length H≥D/7 can ensure satisfactorily high rigidity of the vicinities of the sipe edges of the tread.

The "sipe depth direction" represents a direction orthogonal to a ground contact surface R of the tread in the present invention. The sipe depth direction does not need be strictly orthogonal in mathematical terms to the ground contact surface R of the tread and it suffices for the vertical portion 29 to extend such that winding deformation of the ground contact surface and thus chipping of sipe edges of the tread is well prevented from occurring when the tire is brought into contact with the ground. Accordingly, it is acceptable to set an angle formed by an extending direction of the vertical portion 29 with respect to a ground contact surface R of the tread, measured from the acute angle side, to be in the range of 80° to 90° (inclusive of 80° to 90°).

Figure 8:
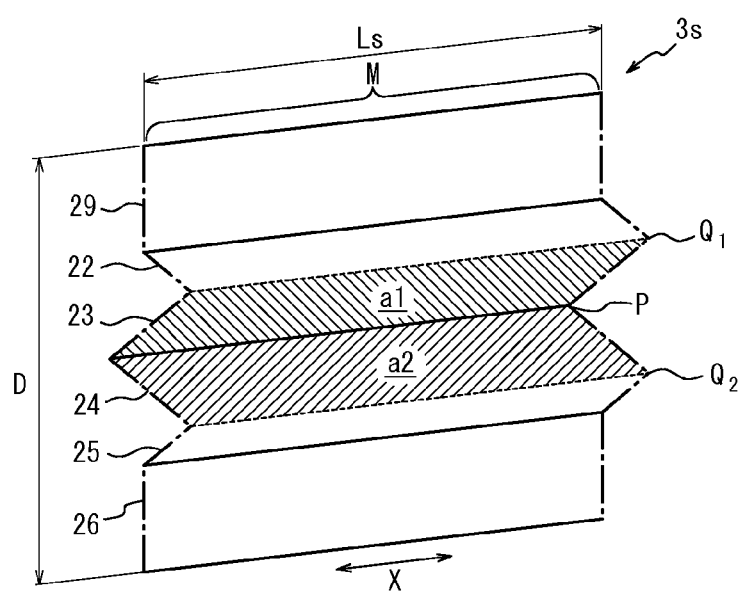
FIG. 8 is a diagram showing a configuration of the sipe ($3s$) of FIG. 7 along the longitudinal direction thereof.

FIG. 8 is a view showing the configuration of the sipe 3s of FIG. 7 over the longitudinal length of the sipe 3s. The same end-face configuration in the sipe width direction as shown in FIG. 7 may continuously extend in the sipe longitudinal direction. Alternatively, the flat region $N_1$ and/or the flat region $N_2$ may be formed on at least one side of the bent region M as in the tire 10 of the aforementioned first embodiment in the sipe 3s of the present embodiment.

In the tire of the present invention, the total length in the sipe longitudinal direction of the flat region(s) N of the sipe 3c in a ground contact tread surface R of the central land portion C is preferably in the range of 1% to 50% (inclusive of 1% and 50%) of the entire length Lc in the longitudinal direction of the sipe 3c.

According to the structure described above, it is possible to obtain a good edge effect caused by the sipe 3c, while maintaining rigidity of the land portion 5 in an adequate range. The total length in the sipe longitudinal direction of the flat region(s) N 1% of the entire length in the longitudinal direction of the sipe 3c allows the central land portion C to satisfactorily cause an edge effect and the total length in the sipe longitudinal direction of the flat region(s) N 50% of the entire length in the longitudinal direction of the sipe 3c ensures that the central land portion C has sufficiently high rigidity required thereof. Accordingly, rigidity of the land portions of the tread 6 can be optimized by adjusting the total proportion of the flat regions in the sipes 3c provided in the land portions $5c_1$ to $5c_3$ constituting the central land portion C, to the total length in the longitudinal direction of the sipes 3c.

The sipe 3c may have the flat region N at only one end side in the longitudinal direction thereof, as described above. The length in the sipe longitudinal direction of the flat region N of the sipe 3c is preferably in the range of 1% to 50% (inclusive of 1% and 50%) of the entire length Lc in the longitudinal direction of the sipe 3c in this case, as well.

In the tire of the present invention, provided that TLs represents the sum of the lengths Ls in the sipe longitudinal direction of all of the sipes 3s in a ground contact tread surface R of the outer side land portions S; Rs represents the total area of the outer side land portions S; TLc represents the sum of the lengths Lc in the sipe longitudinal direction of all of the sipes 3c in a ground contact tread surface R of the central land portion C; Rc represents the total area of the central land portion C, the sipe density ratio TLs/Rs is preferably smaller than the sipe density ratio TLc/Rc.

The aforementioned structure is preferable because: the central land portion C contributes to acquisition of driving force mainly by an edge effect of the sipes 3c when the tire runs on an icy/snowy road; the outer side land portions S contribute to acquisition of driving force mainly by sufficiently high rigidity of the land portions of the tread 6 when the tire runs on a dry road; and in this regard it is possible to cause the tire of the present invention having the sipes 3c and the sipe 3s to fully demonstrate good performances expected thereof by providing a larger number of sipes in the central land portion C than in the outer side land portions S.

In the tire of the present invention, it is preferable, as typically shown in the end-view configuration in the sipe width direction of the sipe 3s of FIG. 7, that the bent section 11 of each of the sipes 3s and the sipes 3c includes, provided that D represents the depth of the sipe 3s, 3c measured from a ground contact surface R of the tread: a first secondary bending point $Q_1$ positioned between the D/7 depth position and the D/2 depth position measured from the ground contact surface R; the primary bending point P positioned between the D/4 depth position and the 3D/4 depth position measured from the ground contact surface R; a second secondary bending point Q2 positioned between the D/2 depth position and the 6D/7 depth position measured from the ground contact surface R; the (first) inclined portion 23 formed between the first secondary bending point $Q_1$ and the primary bending point P; and the (second) inclined portion 24 formed between the primary bending point P and the second secondary bending point $Q_2$.

In the aforementioned structure, the sipe 3s and the sipe 3c each have a configuration which is in the sipe depth direction alternately bent on one side and the other side in the sipe width direction via the primary bending point P, the first secondary bending point $Q_1$ and the second secondary bending point $Q_2$, whereby wall surfaces separated to face each other by the sipes 3s, 3c are brought into contact with each other in a manner of supporting each other to effectively suppress collapsing deformation of the land portions 5s and 5c when the tire 20 runs on a road. In short, the aforementioned structure is advantageous in terms of enhancing an edge effect caused by the sipes formed in the land portions with maintaining good rigidity of the land portions in spite of provision of the sipes therein.

The vertical portion 26 of the sipe, linearly extending in the sipe depth direction from the land-portion-bottom side of the inclined portion 25 in FIG. 7, may have a configuration continuously extending from the inclined portion 25 in the extending direction of the inclined portion 25.

Further, with reference to FIG. 7 and FIG. 8, provided that "a1" represents an area of the first inclined portion 23, i.e. an area calculated by multiplying the short side length E of the first inclined portion 23 by the length Ls in the longitudinal direction of the bent region M (E×Ls); "a2" represents an area of the second inclined portion 24, i.e. an area calculated by multiplying the end side (short side) length F of the second inclined portion 24 by the length Ls in the longitudinal direction of the bent region M (F×Ls); and "A" represents a projected area of an orthographic projection from the sipe width direction, of the bent region M of the sipe 3s, i.e. an area (D×Ls) calculated by multiplying the sipe depth D by the length Ls in the longitudinal direction of the bent region M of the sipe 3s, it is preferable that $0.1 \leq a1/A \leq 0.5$ and $0.1 \leq a2/A \leq 0.5$.

The aforementioned structure in which the ratio $a1/A \geq 0.1$ and the ratio $a2/A \geq 0.1$ ensures sufficiently large areas of the respective inclined portions 23, 24, whereby satisfactorily strong friction force is generated when a force is inputted to the tread and the facing wall surfaces of the inclined portions are brought into contact with each other, to effectively suppress collapsing deformation of the land portions 5s. In contrast, the ratio $a1/A > 0.5$ and/or the ratio $a2/A > 0.5$ bring difficulties to the tire production process. It is therefore preferable that the ratio $a1/A \leq 0.5$ and the ratio $a2/A \leq 0.5$.

In the sipe 3s shown in FIG. 7, provided that $W_1$ represents a distance in the sipe width direction (the direction orthogonal to the sipe longitudinal direction) of the first inclined portion 23 and $W_2$ represents a distance in the sipe width direction (the direction orthogonal to the sipe longitudinal direction) of the second inclined portion 24, it is preferable that $0 < W_1 \leq D/3$ and $0 < W_2 \leq D/3$.

In the aforementioned structure, it is preferable that $W_1 > 0$ and $W_2 > 0$ because then the first inclined portion 23 and the second inclined portion 24, where wall surfaces of the land portion 5s facing each other with the sipe 3s therebetween are to be brought into contact with each other, are reliably formed, thereby well suppressing collapsing deformation from occurring in the land portion 5s. The distance $W_1 \leq D/3$ and $W_2 \leq D/3$ because then it is possible to prevent a tire from being hooked by a mold after vulcanization process of the tire, which prevention is advantageous in terms of tire production.

A plurality of sipes other than the aforementioned sipes 3s, 3c are provided in the tread 6 of the first embodiment and the second embodiment, as show in FIG. 1. Specifically, each block of each land portion 5s at least a portion of which constitutes each outer side land portion S is provided with two sipes such that one ends of the sipes open to the circumferential groove 1 demarcating the land portion 5s and the other ends of the sipes terminate within the land portion 5s. The land portion $5c_1$ as a constituent of the central land portion C has sipes which are provided therein in the tire circumferential direction at constant intervals such that each of the sipes extends to be inclined at a certain angle with respect to the extending direction of the lug groove 4 and one end thereof opens to the corresponding lug groove 4 and the other end thereof merges with the sipe 3c. Further, each of the land portions $5c_2$, $5c_3$ has plural sipes which are provided at the ends terminating within the land portion $5c_2$, $5c_3$, of the lug grooves 4 on the outer side in the tire width direction, such that the sipes extend in the tire circumferential direction. The sipe configurations according to the present invention are applicable to, other than the sipes 3s, 3c, the sipes provided in the land portions $5C_1$, $5C_2$, $5C_3$ constituting the central land portion C as long as only one ends in the sipe longitudinal direction of these sipes open to a groove.

EXAMPLES

Test tires of Examples 1 to 10 according to the present invention and Comparative Example were prepared, respectively, and performance of each of these test tires was evaluated in order to confirm an effect of the present invention.

The test tire of Example 1 had tire size: 215/55R17 and a tread pattern as shown in FIG. 1. The sipe configuration as shown in FIG. 4 was applied to each of the sipes 3s provided in the block-like land portions 5s in the outer side land portions S of the tread of Example 1 tire. Further, the sipe configuration as shown in FIG. 5 was applied to each of the sipes $3c_1$, $3c_2$, $3c_3$ provided in the rib-like land portion 5c in the central land portions C of the tread. Each of the sipes linearly extend in the tire width direction at a ground contact surface R of the tread. Details of the characteristics of the respective sipes are shown in Table 1.

The test tires of Examples 2 to 10 were prepared in the same manner as the test tire of Example 1, except that details of the characteristics of the respective sipes of the former were changed as shown in Table 1.

The test tire of Comparative Example was prepared in the same manner as the test tire of Example 1, except that each sipe of the former extends from a ground contact surface R of the tread in the sipe depth direction in a wavy manner with a constant amplitude.

(Dry Performance)

Each of the test tires described above was assembled with a rim (width: 7J), inflated at air pressure of 230 kPa, and subjected to large shearing force under a predetermined load condition applied thereto. Friction coefficient of the land portions when facing wall surfaces of the sipes were brought into contact with each other, of the test tire, was determined. The friction coefficient values of the respective test tires were compared with each other for evaluation of dry performance of the test tires.

(On-Ice/Snow Performance)

Each of the test tires was assembled with a rim (width: 7J) and inflated at air pressure of 230 kPa. On-ice/snow performance of the tire was evaluated by an on-ice/snow acceleration test including: mounting the tires of the same type on a vehicle; placing the vehicle on an icy/snowy road surface; and counting time taken for the vehicle to run 50 m after the vehicle went full throttle from a standstill.

The results of on-ice/snow performance of the tires are shown in Table 1 as index values relative to the on-ice/snow performance of Comparative Example being "100". The larger index value represents the better on-ice/snow performance.

TABLE 1

| | Example 1 | Example 2 | Example 3 | Example 4 | Example 5 | Example 6 | Example 7 | Example 8 | Example 9 | Example 10 | Comp. Ex. 1 |
|---|---|---|---|---|---|---|---|---|---|---|---|
| Sipe ends in outer side land portion | both ends closed | both ends closed | both ends closed | both ends closed | both ends closed | both ends closed | both ends closed | both ends closed | both ends closed | both ends closed | One end opened |
| Sipe ends in central land portion | both ends opened | both ends opened | both ends opened | both ends opened | both ends opened | both ends opened | both ends opened | both ends opened | both ends opened | both ends opened | One end opened |
| Presence/absence of flat region N — Outer side land portion | None | None | None | None | None | None | None | None | None | None | Present (at one end) |
| Presence/absence of flat region N — Central land portion | Present (at both ends) | Present (at one end) | Present (at both ends) | Present (at both ends) | Present (at both ends) | Present (at both ends) | Present (at both ends) | Present (at both ends) | Present (at both ends) | Present (at both ends) | Present (at one end) |
| Configuration of outer side land portion | Block | Block | Block | Block | Block | Block | Block | Block | Block | Block | Block |
| Configuration of central land portion | Block | Block | Rib | Rib | Rib | Rib | Rib | Rib | Rib | Rib | Block |
| Presence/absence of vertical portion | None | None | None | Present | Present | Present | Present | Present | Present | Present | None |
| Ratio N/Lc (mm) of flat region N with respect to length Lc in longitudinal direction of sipe | 0.1 | 0.1 | 0.1 | 0.1 | 1 | 25 | 50 | 75 | 50 | 50 | 0.1 |
| Sipe density TLs/Rs (mm) in outer side land portion | 0.02 | 0.02 | 0.02 | 0.02 | 0.02 | 0.02 | 0.02 | 0.02 | 0.015 | 0.015 | 0.02 |
| Sipe density TLc/Rc (mm) in central land portion | 0.02 | 0.02 | 0.02 | 0.02 | 0.02 | 0.02 | 0.02 | 0.02 | 0.03 | 0.03 | 0.02 |
| Sipe depth D (mm) | 6.6 | 6.6 | 6.6 | 7 | 7 | 7 | 7 | 7 | 7 | 7 | 6.6 |
| First secondary bending point $Q_1$ position (mm) measured from ground contact surface S | 0.333D | 0.333D | 0.333D | 0.333D | 0.333D | 0.333D | 0.333D | 0.333D | 0.333D | 0.333D | — |
| Primary bending point P position (mm) measured from ground contact surface S | 0.500D | 0.500D | 0.500D | 0.500D | 0.500D | 0.500D | 0.500D | 0.500D | 0.500D | 0.500D | — |
| Second secondary bending point $Q_2$ position (mm) measured from ground contact surface S | 0.666D | 0.666D | 0.666D | 0.666D | 0.666D | 0.666D | 0.666D | 0.666D | 0.666D | 0.666D | — |
| Ratio a1/A of area of first inclined portion with respect to projected area from sipe width direction of bent region M | 0.6 | 0.6 | 0.6 | 0.6 | 0.6 | 0.6 | 0.6 | 0.6 | 0.6 | 0.25 | — |
| Ratio a2/A of area of second inclined portion with respect to projected area from sipe width direction of bent region M | 0.6 | 0.6 | 0.6 | 0.6 | 0.6 | 0.6 | 0.6 | 0.6 | 0.6 | 0.25 | — |
| Dry performance | 105 | 105 | 105 | 106 | 106 | 106 | 106 | 104 | 107 | 107 | 100 |
| On-ice/snow performance | 106 | 105 | 107 | 107 | 108 | 110 | 110 | 110 | 111 | 112 | 100 |

INDUSTRIAL APPLICABILITY

According to the present invention, it is possible to provide a tire exhibiting improved driving performance on each of an icy/snowy road surface and a dry road surface.

REFERENCE SIGNS LIST

1 Circumferential groove
2 Lateral groove
3s Shoulder sipe
3c Center sipe
$3c_1$, $3c_2$, $3c_3$ Center sipe
4 Lug groove
5s Land portion
$5c_1$, $5c_2$, $5c_3$ Land portion
6 Tread
9 Flat section
10, 20 Tire
11, 21 Bent section
12, 13, 14, 15, 22, 25 Inclined portion
23 First inclined portion
24 Second inclined portion
26, 29 Vertical portion
B Width center line of sipe
C Central land portion
D Sipe depth
E End side (short side) length of first inclined portion
F End side (short side) length of second inclined portion
$G_1$, $G_2$, $G_3$ Bending point
K Opening width of sipe
L, Lc, Ls Longitudinal length of sipe
M Bent region
N, $N_1$, $N_2$ Flat region
P Primary bending point
$Q_1$ First secondary bending point
$Q_2$ Second secondary bending point
R Ground contact surface of tread
S Outer side land portion
$W_1$ Distance in sipe width direction of first inclined portion
$W_2$ Distance in sipe width direction of second inclined portion
H Length in sipe depth direction of vertical portion, measured from ground contact surface
X Tire width direction
Y Tire circumferential direction
Z Tire radial direction
a1 Area of first inclined portion in bent region
a2 Area of second inclined portion in bent region

What is claimed is:

1. A tire, comprising:
a tread having at least two circumferential grooves formed in a ground contact surface thereof;
at least three rows of land portions demarcated in the ground contract surface by the at least two circumferential grooves, including a pair of outer side land portions located on the outermost side in the tread width direction and a central land portion constituted of the land portion(s) other than the outer side land portions;
a shoulder sipe formed in each outer side land portion such that respective ends of the sipe in the longitudinal direction thereof terminate in the outer side land portion, the shoulder sipe having in at least a portion in the depth direction thereof a bent section alternately bent on one side and the other side in the sipe width direction and continuously extending along the entire length in the sipe longitudinal direction to form a bent region;
a center sipe formed in the central land portion such that each end of the sipe in the longitudinal direction thereof opens to either the circumferential groove or a lug groove, the center sipe having in at least a portion in the depth direction thereof: a bent section alternately bent on one side and the other side in the sipe width direction and continuously extending in the sipe longitudinal direction to form a bent region; and a flat section extending orthogonal to the ground contact surface of the tread, the flat section being continuous in the sipe longitudinal direction with at least one side of the bent region and extending in the sipe longitudinal direction to form a flat region, wherein the total length in the sipe longitudinal direction of the flat region(s) of the center sipe in the ground contact tread surface of the central land portion is in the range of 1% to 50% (inclusive of 1% and 50%) of the entire length in the longitudinal direction of the center sipe.

2. The tire of claim 1, wherein the outer side land portions are block-like land portions and the central land portion is a rib-like land portion.

3. The tire of claim 1, wherein the shoulder sipe and the center sipe each have a vertical portion extending orthogonal to the ground contact surface of the tread between the ground contact surface and the bent section.

4. A tire, comprising:
a tread having at least two circumferential grooves formed in a ground contact surface thereof;
at least three rows of land portions demarcated in the ground contract surface by the at least two circumferential grooves, including a pair of outer side land portions located on the outermost side in the tread width direction and a central land portion constituted of the land portion(s) other than the outer side land portions;
a shoulder sipe formed in each outer side land portion such that respective ends of the sipe in the longitudinal direction thereof terminate in the outer side land portion, the shoulder sipe having in at least a portion in the depth direction thereof a bent section alternately bent on one side and the other side in the sipe width direction and continuously extending along the entire length in the sipe longitudinal direction to form a bent region;
a center sipe formed in the central land portion such that each end of the sipe in the longitudinal direction thereof opens to either the circumferential groove or a lug groove, the center sipe having in at least a portion in the depth direction thereof: a bent section alternately bent on one side and the other side in the sipe width direction and continuously extending in the sipe longitudinal direction to form a bent region; and a flat section extending orthogonal to the ground contact surface of the tread, the flat section being continuous in the sipe longitudinal direction with at least one side of the bent region and extending in the sipe longitudinal direction to form a flat region, wherein provided that TLs represents the sum of the lengths in the sipe longitudinal direction of all of the shoulder sipes in the ground contact tread surface of the outer side land portions; Rs represents the total area of the outer side land portions; TLc represents the sum of the lengths in the sipe longitudinal direction of all of the center sipes in the ground contact tread surface of the central land portion; Rc represents the total area of the central land portion, the sipe density ratio TLs/Rs is smaller than the sipe density ratio TLc/Rc.

5. The tire of claim 4, wherein the outer side land portions are block-like land portions and the central land portion is a rib-like land portion.

6. The tire of claim 4, wherein the shoulder sipe and the center sipe each have a vertical portion extending orthogonal to the ground contact surface of the tread between the ground contact surface and the bent section.

* * * * *